(12) United States Patent
Yang et al.

(10) Patent No.: US 12,744,804 B2
(45) Date of Patent: Sep. 22, 2026

(54) METHOD OF ASSESSING THREAT LEVEL OF UNIDENTIFIED ASSET AND APPARATUS FOR THE SAME

(71) Applicant: S2W INC., Seongnam-si (KR)

(72) Inventors: Jong Heon Yang, Seoul (KR); Hyung Suk Kim, Seongnam-si (KR); Hyun Jong Moon, Seoul (KR); Ja Il Jo, Seongnam-si (KR); Sang Duk Suh, Seongnam-si (KR); Jae Ki Kim, Changwon-si (KR)

(73) Assignee: S2W INC., Seongnam-si (KR)

( * ) Notice: Subject to any disclaimer, the term of this patent is extended or adjusted under 35 U.S.C. 154(b) by 46 days.

(21) Appl. No.: 18/543,564

(22) Filed: Dec. 18, 2023

(65) Prior Publication Data

US 2024/0323213 A1 Sep. 26, 2024

(30) Foreign Application Priority Data

Dec. 28, 2022 (KR) ........................ 10-2022-0187190

(51) Int. Cl.
*H04L 9/40* (2022.01)

(52) U.S. Cl.
CPC ................................ *H04L 63/1425* (2013.01)

(58) Field of Classification Search
CPC ............. H04L 63/1416; H04L 63/1425; H04L 63/1433; H04L 63/1408
See application file for complete search history.

(56) References Cited

U.S. PATENT DOCUMENTS

2006/0229896 A1* 10/2006 Rosen ................ G06Q 10/1053 705/321
2008/0229420 A1* 9/2008 Jeschke ............... H04L 63/1433 726/25
2014/0047546 A1* 2/2014 Sidagni ................ G06F 21/577 726/25
2015/0150072 A1* 5/2015 Doctor ................ H04L 63/1433 726/1
2022/0060500 A1* 2/2022 Hayman ............. H04L 63/1433
2022/0345483 A1* 10/2022 Shua ..................... H04L 9/0825

FOREIGN PATENT DOCUMENTS

CN 113824740 A 12/2021
KR 10-2006-0031594 A 4/2006

OTHER PUBLICATIONS

Communication dated Aug. 22, 2024, issued in Korean Application No. 10-2022-0187190.
Criminal IP Technical Document, “Security Threats of Systems Left in a Default Password State”, Criminal IP, Jun. 23, 2022 (16 pages total).

* cited by examiner

*Primary Examiner* — Dao Q Ho
(74) *Attorney, Agent, or Firm* — USX IP LLC

(57) ABSTRACT

An apparatus for deriving a threat level of data according to an embodiment of the present disclosure includes a first scanning unit configured to confirm network information including host information and information about one or more services included in a server, a second scanning unit configured to confirm data disclosed on the server and generate a plurality of data sets by combining at least one of the confirmed data and pre-stored words, and a threat level analysis unit configured to analyze the threat level based on the network information and the plurality of data sets.

8 Claims, 5 Drawing Sheets

METHOD OF ASSESSING THREAT LEVEL OF UNIDENTIFIED ASSET AND APPARATUS FOR THE SAME

CROSS-REFERENCE TO RELATED APPLICATION

This application claims priority to and the benefit of Korean Patent Application No. 2022-0187190, filed on Dec. 28, 2022, the disclosure of which is incorporated herein by reference in its entirety.

BACKGROUND

1. Field of the Invention

The present disclosure relates to a method, apparatus, and system for assessing the threat level of unidentified assets, that is, information and data that cannot be managed or identified by an administrator or user. More particularly, the present disclosure to a cyber threat intelligence system capable of searching/detecting unidentified assets, that is, data, network information, configuration information, etc., that are not significantly or easily exposed to the outside beyond data that is externally disclosed, and analyzing the retrieved/detected unidentified assets to analyze the threat level (or information exposed to risk, security vulnerability, etc.) of a target server(s) or service(s).

2. Discussion of Related Art

As the importance and amount of information within information assets increases, the importance of security in the network has also emerged. To secure the information assets, various security devices and systems such as integrated security management systems, threat management systems, and firewalls are being utilized. Currently, a large number of security events are occurring due to an increase in continuous and variable cyber intrusion attempts, and an efficient response to changing attacks is necessary.

Security vulnerability diagnosis is the examination of threats that may allow an illegal user to access to information systems or threats of leakage, alteration, and deletion of important data managed in the assets to be diagnosed, and refers to analyzing the security level of diagnostic target assets after inspecting whether there are security vulnerabilities in the diagnostic target assets.

When the number of diagnostic target assets managed by security managers increases with a vast increase in the number of information assets, when the diagnostic target assets have been in use for an extended period, or when the security manager of the diagnostic target assets changes, it was difficult to accurately know the asset information of all the diagnostic target assets, and it was cumbersome to verify the asset information by directly accessing all systems in order to verify the asset information accurately. As a result, there is a risk of omission in assets connected to the network.

Recently, by performing preliminary research, performing port investigation, finding vulnerabilities, and executing threats on network services through a web server, there were problems of attempts to access the network through a specific port on the network or attempts to infiltrate the web server to carry out attacks such as hacking. In protecting the network services from such attacks, the priority is to confirm assets connected to the network and diagnose vulnerabilities in advance.

SUMMARY OF THE INVENTION

The present disclosure is directed to providing a method, apparatus, and system for recognizing unidentified assets exposed on a network and assessing the risk and threat level of the unidentified assets.

The technical problems to be solved by the present disclosure are not limited to the above-mentioned technical problems, and other technical problems that are not mentioned can be clearly understood by those skilled in the art from this specification and the attached drawings.

According to an aspect of the present disclosure, there is provided an apparatus for deriving the threat level of data, the apparatus including a first scanning unit configured to confirm network information including host information and information about one or more services included in a server, a second scanning unit configured to confirm data disclosed on the server and generate a plurality of data sets by combining at least one of the confirmed data and pre-stored words, and a threat level analysis unit configured to analyze the threat level based on the network information and the plurality of data sets.

According to embodiments, the network information may include banner information and certificate information for each of the one or more services included in the server. In addition, the first scanning unit may confirm the banner information and certificate information for each of the one or more services by searching a plurality of ports based on Internet protocol (IP) information of the server.

Further, the apparatus for deriving the threat level of data according to embodiments may further include a transmitter configured to request, by the first scanning unit or the second scanning unit, the network information or the data disclosed on the server from the server, and a receiver configured to receive a response based on the request.

Furthermore, the transmitter according to embodiments may request the network information about the one or more services included in the server in a random order.

In addition, the second scanning unit according to embodiments may confirm the data disclosed on the server at a predetermined period and generate a plurality of data sets at the predetermined period.

The apparatus for deriving the threat level of data according to embodiments may further include a first storage unit configured to store the network information; and a second storage unit configured to store the plurality of data sets, wherein the second scanning unit may further confirm uniform resource locator (URL) or domain information indicating a source from which the data disclosed on the server is collected and the second storage unit may store the data disclosed on the server together with the URL or domain information.

Furthermore, the data disclosed on the server according to embodiments may further include account information, and the second scanning unit may combine words related to an ID or a password among pre-stored words and store a result of the combination or a hash value of the result together with the account information in the second storage unit.

In addition, the threat level analysis unit according to embodiments may derive the threat level based on at least one of whether each service is externally disclosed, whether the communication type is in plaintext, whether the version is the latest, whether there are disclosed vulnerabilities, whether certificate is possible based on the plurality of data sets, and whether sensitive information is included in banner information.

Further, the analysis unit according to embodiments may derive the threat level further based on whether each page provided by a hypertext transfer protocol (HTTP)-related service is externally disclosed, whether sensitive information is included in each page, and whether the HTTP-related service is externally disclosed.

Technical Solutions of the present disclosure are not limited to the above-mentioned technical solutions, and the technical solutions that are not mentioned can be clearly understood by those skilled in the art from this specification and the attached drawings.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
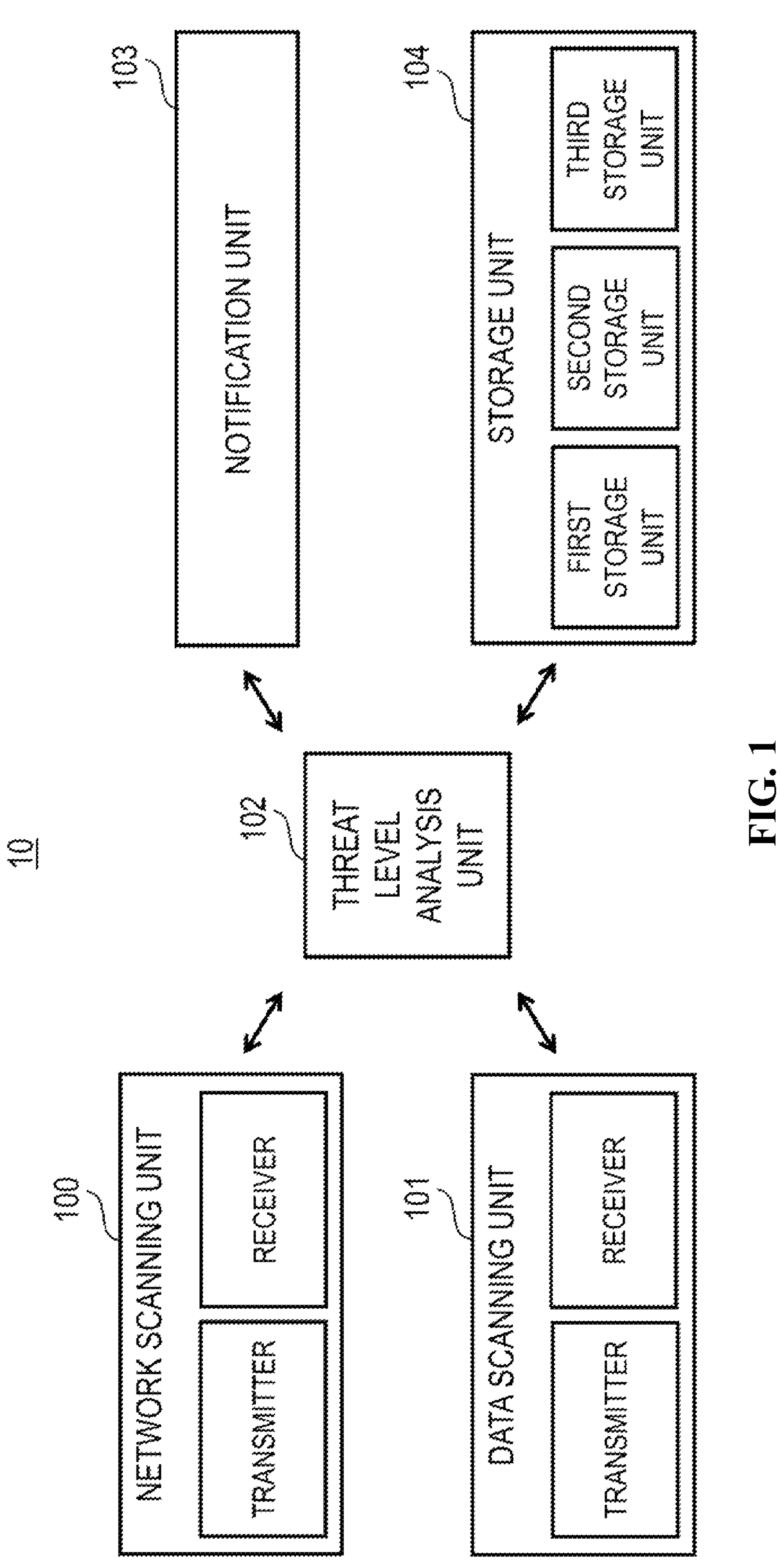
FIG. 1 is a diagram illustrating the configuration of a system for assessing the threat level of unidentified assets according to an embodiment of the present disclosure.

The advantages and features of the present disclosure and methods therefor will become apparent with reference to the embodiments described below in detail in conjunction with the accompanying drawings. However, the present disclosure is not limited to the embodiments disclosed below, and may be implemented in various different forms. The present embodiments are provided only to ensure the disclosure of the present specification is complete and to completely inform those of ordinary skill in the art of this specification the scope of the present invention, and the specification will be defined by the scope of the claims.

Terms such as first, second, A, B, and the like may be used for describing various components, but the components are not limited by the terms and the terms are used only for distinguishing one component from other components. For example, a first component may be referred to as a second component, and similarly, the second component may also be referred to as a first component, without departing from the scope of the invention to be described below. The term "and/or" includes a combination of a plurality of associated disclosed items or any item of the plurality of associated disclosed items.

When a first component is mentioned as being "connected" to or "accessing" a second component, this may mean that the first component is directly connected to or accessing the second component, but it is to be understood that a third component may exist therebetween. On the other hand, when a component is mentioned as being "directly connected" to or "directly accessing" another component, it is to be understood that there are no other components therebetween.

The terms used in the present application are merely used to describe particular embodiments, and are not intended to limit the present invention. An expression used in the singular encompasses the expression of the plural unless it has a clearly different meaning in the context. In the present application, it is to be understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings. In the drawings, like reference numerals represent like elements.

FIG. 1 is a diagram illustrating the configuration of a system for assessing the threat level of unidentified assets according to an embodiment of the present disclosure.

The system for assessing the threat level of unidentified assets recognizes identified or unidentified assets that are stored in or provided by one or more servers to provide the assets as services, analyzes these assets, and derives the threat level of the assets.

The system for assessing the threat level of unidentified assets may detect data stored or disclosed by a target server(s) or services (e.g., account information or services) being executed, analyze the detected result, and confirm whether there is an element that is infringed or threatened based on the analysis result. For example, the system of the present disclosure may analyze security vulnerabilities in various ways to analyze the threat level of the detected data, such as whether certificate can be obtained from the server based on data that has been already exposed by the server, whether access with the authority of a super-user can be permitted, whether sensitive information can be obtained or hijacked, and the like.

To this end, the configuration 10 of the system for assessing the threat level of unidentified assets may include a network scanning unit 100, a data scanning unit 101, a threat level analysis unit 102, a notification unit 103, and a storage unit 104. For reference, in FIG. 1, the relationship is indicated with a double-headed arrow for only some of the components, but the other components are omitted due to difficulty in representation on the drawing, but it should be interpreted that all components can be interconnected. For example, it should be noted that the network scanning unit 100 is linked to the storage unit 104, and any network information scanned or detected by the network scanning unit 100 can be stored sufficiently in the storage unit 104.

The network scanning unit 100 collects or scans network information of one or more servers. The network scanning unit 100 may scan or search for host information, Internet protocol (IP) address information, and port information related to functions or services provided by the above-mentioned server(s), other bibliographic information that can identify other server(s) (e.g. medium access control (MAC) address information), information about services provided by each server, operating system information, location information, version information of each service, information about the function or method performed by each service, network-related data stored on server(s), network-related plug-in information, external disclosure of each network information or information related to accessibility, etc.

The network scanning unit 100 may sequentially perform one or more predetermined instructions to collect the above-described network information. For example, the network scanning unit 100 may search all IP addresses and port numbers for all bands to confirm host information of the server, information about the services provided by the server, and a port through which each service is provided.

For example, the network scanning unit 100 may detect services connected to the network using a port scan method. The port scan refers to searching for transmission control protocol (TCP)/user datagram protocol (UDP) ports that are available for a server being executed. Here, when a port scan command is transmitted from the system for recognizing unidentified assets, a return value may be obtained from a target system or service. In this manner, a target system connected to the network and a port to which the target system is connected may be detected, and methods for detecting network connections other than the above-described method can be used or open sources such as network mapper (Nmap) can also be utilized.

The data scanning unit 101 may scan account information stored or exposed in the server(s). The data scanning unit 101 may also scan information related to a specific user, files stored on the server, or information about the hierarchy of directories in which the related files are stored.

The data scanning unit 101 may collect data (e.g., source code of a web page, JavaScript code, etc., in the case of a hypertext transfer protocol (HTTP) service) provided publicly or privately by the server(s), and analyze the collected data. The data scanning unit 101 may crawl a web page or collect all account information and packets provided by the web page, with respect to data provided through HTTP services.

The data scanning unit 101 may collect account information or account-related information (e.g., ID information of a specific user, personal information of a specific user, email information of a specific user, etc.) provided publicly or privately by the server(s).

The data scanning unit 101 may classify the data, account information, and/or account-related information provided publicly or privately by the server(s), for each of the provided services.

Meanwhile, the data scanning unit 101 may store a data set including a plurality of words or tokens. The data set is, for example, a list of predetermined characters or arrays, and elements of each list may include characters or arrays frequently used as certificate information or passwords. That is, the data scanning unit 101 may previously store a data set that is a list of characters or arrays frequently used by many users as ID information or password information.

The data scanning unit 101 may combine the elements included in the above-described data set and the data detected based on the above-described method. That is, the data scanning unit 101 may combine each of the data, account information, and/or account-related information provided publicly or privately by the server(s) with the elements included in the data set, and generate candidates that can be used as certificate information.

The threat level analysis unit 102 may use the network information collected by the above-described network scanning unit 100 and the candidates that can be used as the data collected by the data scanning unit 101 or the generated certificate information to derive and analyze the threat level of the server (or each service of the server).

When the threat level is high, the notification unit 103 may notify an administrator or a user of this based on the results analyzed by the threat level analysis unit 102. The notification unit 103 may provide corresponding information to the administrator or the user in the form of notification message or alarm. The notification unit 103 may notify the user or administrator of which data is threatening based on the results analyzed by the threat level analysis unit 102.

The storage unit 104 may store the network information and data of the server(s) scanned by the network scanning unit 100 and data scanning unit 101 described above. The storage unit 104 may classify and store or separately store information or data related to each service for each service provided by the server(s). In addition, the storage unit 104 may include a first storage unit that stores the network information collected by the network scanning unit 100, a second storage unit that stores the data collected by the data scanning unit 101, and/or a third storage unit that stores the results analyzed by the threat level analysis unit 102.

The storage unit 104 may be configured as a database that can categorize and store provided account information, services, and service-related data.

According to an embodiment of the present disclosure, the system for assessing the threat level of unidentified assets can detect potential risks present in a server(s) in various ways, thereby reducing errors generated when a user directly reviews all risks, that is, human errors.

Meanwhile, the network scanning unit 100 and the data scanning unit 101 may sequentially scan or search data or services included in the server, but may also scan or search the data or services in a random order or a predetermined logical order (e.g., the order in which each service or each server is searched once or partially for each iteration or epoch, the order in which each service or server is configured based on various scheduling methods such as Round Robin, etc.). The network scanning unit 100 and the data scanning unit 101 may each include a transmitter and/or a receiver, and each of the transmitter and the receiver may communicate with the server(s) individually or asynchronously and collect necessary network information or data from the server(s).

According to an embodiment of the present disclosure, the system for assessing the threat level of unidentified assets can reduce network load on the server(s) and reduce unnecessary delays, while reducing interference occurring in service provision and efficiently detecting the threat level of the server(s).

Figure 2:
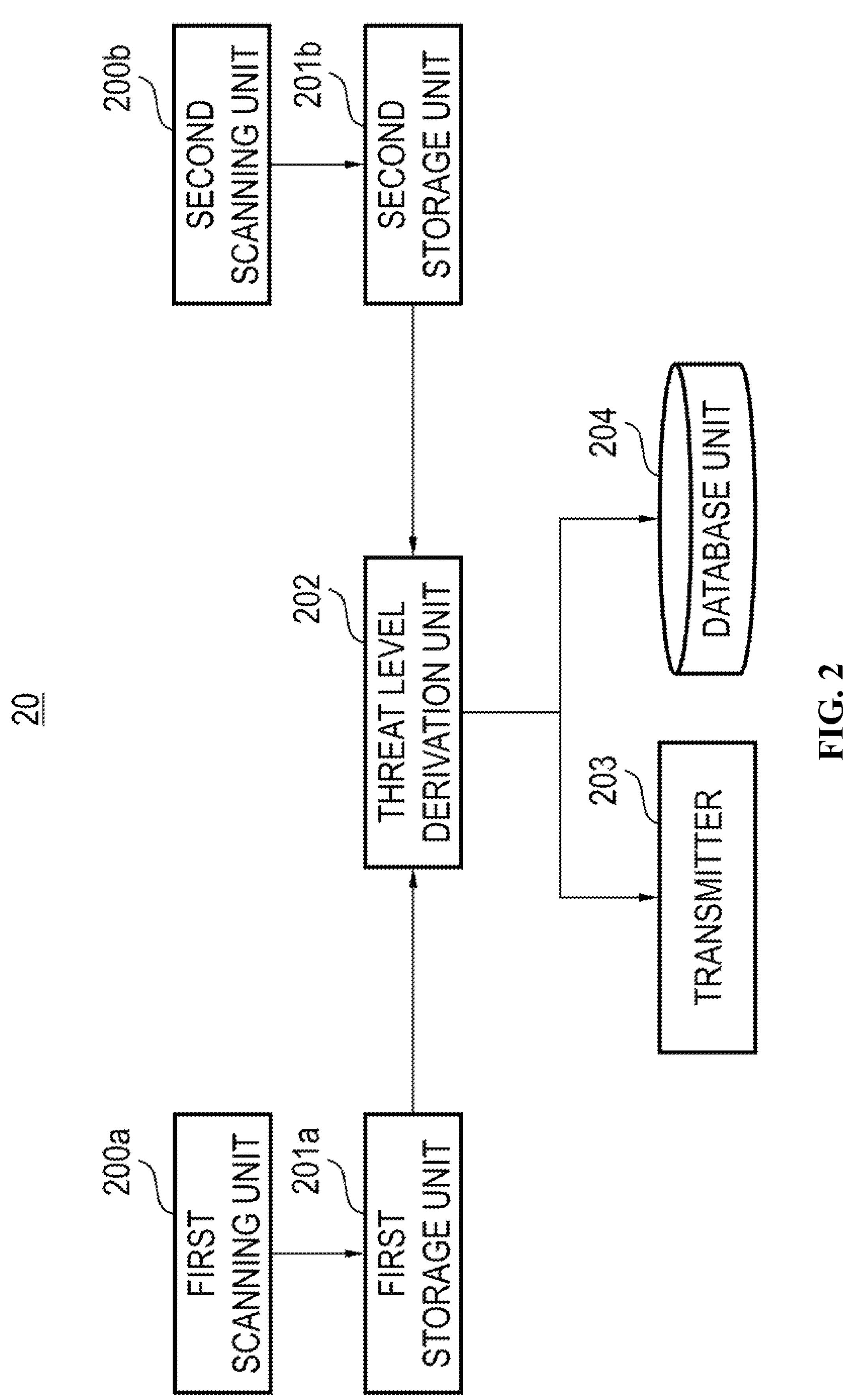
FIG. 2 is a diagram illustrating an operation example of a system for assessing the threat level of unidentified assets according to an embodiment of the present disclosure.

FIG. 2 is a diagram illustrating an operation example of a system 20 for assessing the threat level of unidentified assets according to an embodiment of the present disclosure.

All or some of the operations shown in FIG. 2 may be performed systematically by the component(s) shown in FIG. 1.

Referring to FIG. 2, the system 20 for assessing the threat level of unidentified assets according to embodiments may include a first scanning unit 200*a*, a second scanning unit 200*b*, a first storage unit 201*a*, a second storage unit 201*b*, a threat level derivation unit 202, a transmitter 203, and/or a database unit 204. All or some of the components shown in FIG. 2 may be included in one electronic device, or may be distributed and implemented on one or more devices or servers.

The first scanning unit 200*a* may collect or scan network information of one or more servers. The first scanning unit 200*a* may correspond to the network scanning unit 100 described in FIG. 1.

The second scanning unit 200*b* may scan or collect account information stored in the server(s), related files, information about the hierarchy of directories in which assets and related files are stored, data provided publicly or privately by the server(s), account information provided publicly or privately by the server(s), or account-related information. The second scanning unit 200*b* may correspond to the data scanning unit 101 described in FIG. 1.

The first storage unit 201*a* stores network information collected by the first scanning unit 200*a*. The first storage unit 201*a* may classify and store the network information, collected by the first scanning unit 200*a*, for each service provided by the server(s). The first storage unit 201*a* may correspond to the first storage unit of FIG. 1 and may be implemented in the form of a database.

The second storage unit 201*b* stores data or information collected by the second scanning unit 200*b*. The second storage unit 201*b* may classify and store the data or information, collected by the second scanning unit 200*b*, for each service provided by the server(s) or for each type of a file (e.g., file type, file name, etc.), and may be implemented in the form of a database.

The threat level derivation unit 202 may use the network information collected by the above-described first scanning unit 200*a* and candidates that can be used as the data collected by the second scanning unit 200*b* or generated certificate information to derive and analyze the threat level of the server (or each service of the server).

The threat level derivation unit 202 may be a device or system that analyzes, when each service included in the server(s) exists internally or externally, how high the threat level of each service included in the server(s) on the basis of the scanning or searching results of the above-described first scanning unit 200*a* and/or second scanning unit 200*b*.

The threat level derivation unit 202 may analyze services based on calculation that a service that should be used only internally has a greater threat level when the service is detected externally. For example, the threat level derivation unit 202 may analyze the threat level of an HTTP service among the services provided by the server. In this case, the threat level derivation unit 202 may confirm whether a page that should be accessible only to the administrator is exposed to the outside. For example, the threat level derivation unit 202 may inquire for accessibility information (e.g., read, write, modify permission, etc.) of an administrator page or of data used in the administrator page to confirm whether the inquired accessibility information is exposed externally or can be modified. For example, when providing a service, the threat level derivation unit 202 may inquire for accessibility information (e.g., read, write, modify permissions, etc.) of data or log containing sensitive information in an allocated storage space to confirm whether the inquired accessibility information is exposed externally or can be modified.

The threat level derivation unit 202 may analyze the services included in or provided by the server(s) to be inspected, and analyze the threat level based on detailed confirmation criteria for each type of the service or each characteristic of the service. For example, the threat level derivation unit 202 may analyze the threat level of the HTTP service based on criteria necessary for the security of the HTTP service (e.g., predetermined criteria).

Specific methods or criteria in which the threat level derivation unit 202 derives the threat level based on the collected information or data will be described in detail in FIGS. 4 and 5.

The transmitter 203 may receive threat level information (e.g., threat score, threatening factor, threat level and the like) derived by the threat level derivation unit 202 or results (e.g., vulnerabilities and the like) analyzed by the threat level derivation unit 202 and transmit the received threat level information or analyzed results to the terminal device of the user or administrator.

The database unit 204 may store the network information and the data of the server(s) which are scanned by the above-described network scanning unit 100 and data scanning unit 101. The database unit 204 may classify and store or separately store information or data related to each service for each service provided by the server(s).

According to an embodiment of the present disclosure, a system for assessing the threat level of unidentified assets can detect potential risks present in a server(s) from various ways, thereby reducing errors generated when a user directly reviews all risks, that is, human errors.

According to an embodiment of the present disclosure, the system for assessing the threat level of unidentified assets can reduce network load on the server(s) and reduce unnecessary delays, while reducing interference occurring in service provision and efficiently detecting the threat level of the server(s).

Figure 3:
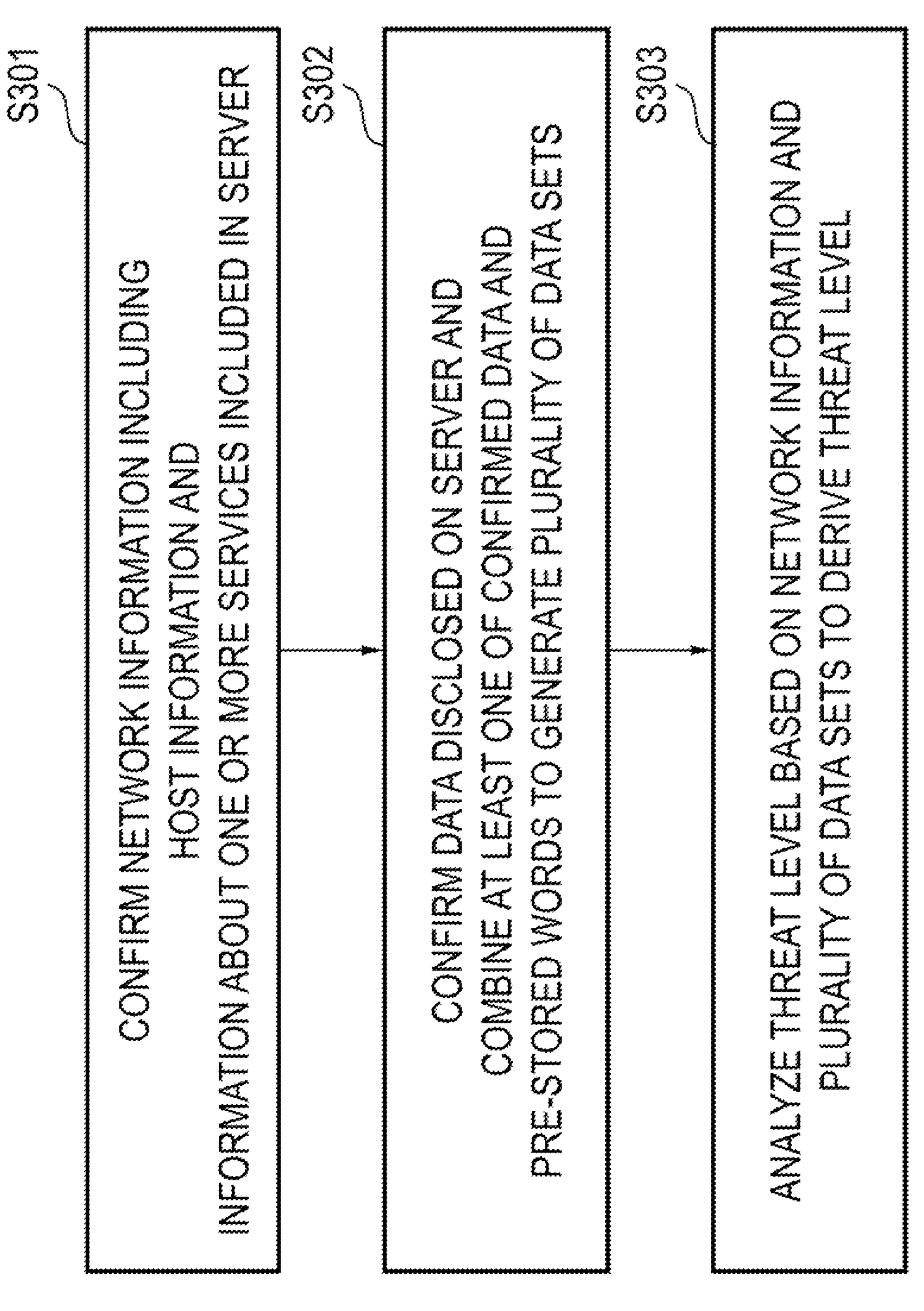
FIG. 3 illustrates a method of assessing the threat level of unidentified assets according to an embodiment of the present disclosure.

FIG. 3 illustrates a method of assessing the threat level of unidentified assets according to an embodiment of the present disclosure.

Some or all of the operations shown in FIG. 3 may be performed by a system for assessing the threat level of unidentified assets or an apparatus for assessing the threat level of unidentified assets according to embodiments.

Referring to FIG. 3, in operation S301, the system for assessing the threat level of unidentified assets may confirm network information including host information and information about one or more services included in a server(s) to be analyzed. Here, the network information may include detailed information (e.g., banner information, certificate information, etc.) about each of one or more services provided by or included in the above-described server(s).

Operation S301 of FIG. 3 may be performed, for example, by the network scanning unit 100 of FIG. 1 or the first scanning unit 200*a* of FIG. 2.

Meanwhile, in operation S301, the system for assessing the threat level of unidentified assets may perform inquiry or information request with respect to all bands of the server(s) to be analyzed. For example, the system for assessing the threat level of unidentified assets may request for information from all IP bands where the server(s) may exist based on already known host information (e.g., the host's IP information and/or the host's subnet mask information, etc.), and receive responses from all IP bands. In addition, the system for assessing the threat level of unidentified assets may inquire for or search for a plurality of ports for each server to inquire for and confirm detailed information (e.g., banner information, certificate information, version information, account information, etc.) about each of one or more services provided by the server(s).

In operation S301, the system for assessing the threat level of unidentified assets may collect network information in consideration of the number of all cases in all bands in which a host may exist, as described above. Here, the system for assessing the threat level of unidentified assets may sequentially inquire for and confirm IP addresses and/or ports in all bands, but may also inquire for the IP addresses and/or ports in a random order. For example, when there are 10 services provided by host A and 20 services provided by host B, the system for assessing the threat level of unidentified assets may select a total of 30 services in a random order, including 10 services provided by host A and 20 services provided by host B, and request for and acquire detailed information about each service. In addition, when there is a large amount of information to be requested from one server, some of data to be requested from one server may be divided and scheduled separately. For example, when there is a large amount of network information collected for service X provided by host A, some of the network information to be collected for service X may be separately scheduled and then requested after other services may be randomly inquired and then requested. In addition, the system for assessing the threat level of unidentified assets may asynchronously request for detailed information for each service and receive the requested information separately.

Next, in operation S302, the system for assessing the threat level of unidentified assets may confirm data disclosed on the server(s) and generate a plurality of data sets by combining at least one of the confirmed data and previously stored words.

Similar to operation S301 described above, even in operation S302, the system for assessing the threat level of unidentified assets may schedule or collect data for each service (e.g., account information, information about web pages, related metadata files, manifest files, log files, etc.) in a random order.

The system for assessing the threat level of unidentified assets may store the network information and/or data collected or confirmed in operations S301 and S302 described above in the storage unit 104 according to embodiments.

Meanwhile, the system for assessing the threat level of unidentified assets may confirm or perform the above-described operations S301 and/or S302 in real time or at regular intervals. Furthermore, the system for assessing the threat level of unidentified assets may classify and store the network information and/or data collected in the above-described operations S301 and/or S302 for each purpose or service, and the classified and stored information may be stored in the form of a database.

Meanwhile, in operation S302, the system for assessing the threat level of unidentified assets may collect publicly disclosed data along with their source information and store the collected data and the source information together in the storage unit 104. For example, when a web page containing account information of a specific user or administrator is confirmed in operation S302, the account information may be stored in the storage unit 104 together with address information (e.g., uniform resource locator (URL) or domain information) of the web page.

Furthermore, there is a case in which the account information of a specific user or administrator is confirmed in data disclosed externally by the server (e.g., a web page that allows external access) in the system for assessing the threat level of unidentified assets. In this case, there is a high possibility that the account information will be a target of attack from an external attacker. Accordingly, in this case, the system for assessing the threat level of unidentified assets may store, in the storage unit 104, data sets obtained by combining characters or arrays (e.g., words, tokens, combinations of characters and frequent words that confirmed on the same web page or in the same area within the web page, etc.) confirmed to be highly relevant to the corresponding account information, or frequently used words (can be predetermined in the form of list) related to ID/password. For example, when an administrator's email address is identified on a specific web page, the system for assessing the threat level of unidentified assets may generate data sets obtained by combining the email address with one or more words extracted from the web page where the email address was identified, frequently used words related to ID/password, and/or combinations thereof, and store the generated data sets. In addition, the system for assessing the threat level of unidentified assets may store the combined results or hash values (hash values to which MD5, SHA-256, etc., are applied) of these results in the storage unit 104 along with the above-described account information.

Next, in operation S303, the system for assessing the threat level of unidentified assets may derive the threat level by analyzing the threat level based on the network information and the plurality of data sets. Operation S303 may be performed, for example, by the threat level analysis unit 102 of FIG. 1 and/or the threat level derivation unit 202 of FIG. 2.

In operation 303, the system for assessing the threat level of unidentified assets may measure the threat level of the server(s) based on the network information and the above-described data sets. The system for assessing the threat level of unidentified assets may measure the overall threat level of the server(s), measure the threat level for each of the server(s), or measure the threat level for each of the services.

Here, the system for assessing the threat level of unidentified assets may measure the threat level for each service, and derive the threat level for the overall server(s) based on the measured threat level for each service. For example, the system for assessing the threat level of unidentified assets may confirm whether each service is disclosed externally (accessibility information, security information, etc.), whether the disclosed service is a service that is not appropriate to be exposed to the outside (e.g. FTP service, SSH service, etc.), whether the communication type is a plaintext (e.g. telnet, etc.), whether the version is the latest (e.g., whether the version of PHP is the latest or recommended version), and whether there are disclosed vulnerabilities (e.g., there are known security vulnerabilities in the version or function of PHP), and measure the threat level based on the confirmed results.

In addition, based on the plurality of data sets generated through operation S302 described above, the system for assessing the threat level of unidentified assets may confirm whether certificate is possible within each server (e.g., whether to attempt to authenticate a privileged account, root account, authority of a super-user, etc.), whether various data chunks or banner information contain sensitive information (e.g., personal information, password information, or certificate information) or are set to be disclosed. Here, the system for assessing the threat level of unidentified assets may measure the threat level more precisely based on these.

In operation 303, examples of specific methods or criteria in which the system for assessing the threat level of unidentified assets measures the threat level of servers or services will be described in FIG. 4.

According to an embodiment of the present disclosure, the system for assessing the threat level of unidentified assets can reduce network load on the server(s) and reduce unnecessary delays, while reducing interference occurring in service provision and efficiently detecting the threat level of the server(s).

According to an embodiment of the present disclosure, the system for assessing the threat level of unidentified assets can quickly identify unidentified assets such as assets, data, and network settings that are not recognized internally by the server or service.

Figure 4:
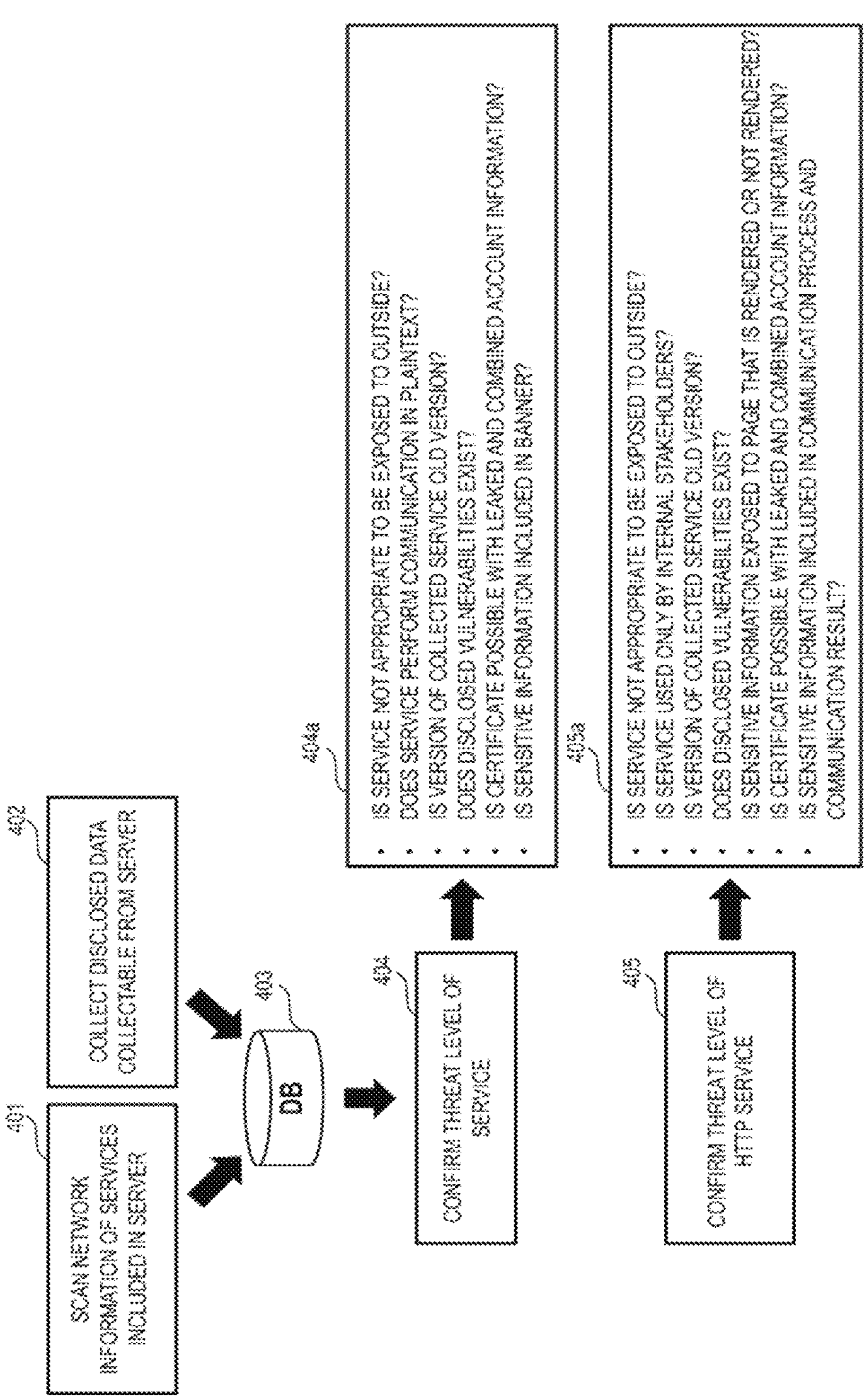
FIG. 4 illustrates an example of a specific method of assessing the threat level of unidentified assets according to an embodiment of the present disclosure.

FIG. 4 illustrates an example of a specific method of assessing the threat level of unidentified assets according to an embodiment of the present disclosure.

FIG. 4 illustrates an example of a method in which a system for assessing the threat level of unidentified assets according to embodiments derives the threat level of server(s) or service(s). First, referring to FIG. 4, in operation 401, an apparatus (or system) for assessing the threat level of unidentified assets according to embodiments scans network information of services included in a server. Operation 401 may be performed by, for example, the network scanning unit 100 of FIG. 1 and the first scanning unit 200*a* of FIG. 2, and perform operation S301 of FIG. 3.

In addition, in operation 402, the apparatus (or system) for assessing the threat level of unidentified assets according to embodiments collects disclosed data that can be collected from the server. Operation 402 may be performed by, for example, the data scanning unit 101 of FIG. 1 and the second scanning unit 200*b* of FIG. 2, and perform operation S302 of FIG. 3.

The apparatus (or system) for assessing the threat level of unidentified assets according to embodiments may store data collected by operation 401 and/or operation 402 in the storage unit 104 or the database 403 according to embodiments.

In operation 404, the apparatus (or system) for assessing the threat level of unidentified assets according to embodiments may derive the threat level for each of one or more services. The apparatus for assessing the threat level of unidentified assets may measure the threat level for each service, and derive the threat level for the overall server based on the measured threat level for each service.

The apparatus for assessing the threat level of unidentified assets may confirm whether each service is disclosed externally (accessibility information, security information, etc.). The apparatus for assessing the threat level of unidentified assets may confirm bibliographic information (e.g., setting information on disclosure scope, etc.) of the one or more services to confirm whether the disclosed service is a service that is not appropriate to be exposed to the outside (e.g., FTP service, SSH service, etc.). When it is confirmed that the disclosed service is not appropriate to be exposed to the outside, the apparatus for assessing the threat level of unidentified assets may notify the user or administrator of inappropriate services (or information about services). The apparatus for assessing the threat level of unidentified assets may set the threat level to be high in proportion to the number of services that are not appropriate for external exposure.

The apparatus for assessing the threat level of unidentified assets may confirm whether the communication type of each service is in plaintext (e.g., telnet, etc.), confirm the security status of the service that communicates in plaintext based on one or more predetermined conditions, and inquire whether certificate of the corresponding service can be obtained (e.g., whether the authority of a super-user can be obtained) from the data set according to the embodiment. When it is confirmed that certificate can be obtained or the security status is confirmed to be weak, the apparatus for assessing the threat level of unidentified assets may set the threat level to be high.

The apparatus for assessing the threat level of unidentified assets may confirm version information of each service and confirm whether the version of the service is the latest or a recommended version. The apparatus for assessing the threat level of unidentified assets may set the threat level to be high when the confirmed version of the service is not the latest or needs a large number of updates to be the recommended version.

The apparatus for assessing the threat level of unidentified assets may confirm whether the disclosed vulnerabilities exist (e.g., whether the security vulnerability is known from the version or function of PHP). The apparatus for assessing the threat level of unidentified assets may store one or more logical conditions for inspecting already known security vulnerabilities, detect the security vulnerabilities based on the logical conditions, and measure the threat level in proportion to the number of detected assets.

The apparatus for assessing the threat level of unidentified assets may test whether certificate is possible from each service or each server with leaked and combined account information. The apparatus for assessing the threat level of unidentified assets may use the data sets according to embodiments.

The apparatus for assessing the threat level of unidentified assets may confirm the contents of the collected data or the account information, and confirm whether the data or the account information contains sensitive information (e.g., personal information, address information, password information, ID information, etc.). The apparatus for assessing the threat level of unidentified assets may set the threat level to be high based on the frequency of the confirmed sensitive information.

Meanwhile, in operation 405, in the case of HTTP service, the apparatus (or system) for assessing the threat level of unidentified assets according to embodiments may use additional conditions or criteria for the service to confirm or derive the threat level. The apparatus (or system) for assessing the threat level of unidentified assets according to embodiments may derive the threat level further based on whether each page provided by HTTP-related services is disclosed externally, whether each page contains sensitive information, and whether the HTTP-related service is disclosed externally.

For example, the apparatus (or system) for assessing the threat level of unidentified assets according to embodiments may confirm whether data related to the HTTP service (i.e., data collected through operation 402) is data used only by internal stakeholders or information exposed only to internal stakeholders, with respect to the HTTP service. For example, when an administrator (admin) page is exposed, the admin page is exposed only to the administrator, but when the admin page is set to be exposed to all users, the threat level may be set to be high.

In addition, for example, the apparatus (or system) for assessing the threat level of unidentified assets may confirm whether sensitive information is exposed to data (page) that is rendered, that is, exposed, or not rendered or temporarily exposed based on a specific method, with respect to the HTTP service. When the sensitive information is exposed to the data, the threat level may be set to be high.

In addition, for example, the apparatus (or system) for assessing the threat level of unidentified assets may confirm whether the sensitive information is included in the HTTP communication process and communication result (e.g., request and response in GET method, request and response in POST method, etc.) or whether the sensitive information is communicated in an unencrypted state, with respect to the HTTP service. When the sensitive information is exposed directly or is encrypted so as to be easily decrypted (e.g., when the sensitive information is encrypted in a widely known decryption method), the threat level may be set to be high.

According to an embodiment of the present disclosure, the system for assessing the threat level of unidentified assets can quickly identify unidentified assets such as assets, data, and network settings that are not recognized internally by the server or service.

According to an embodiment of the present disclosure, the system for assessing the threat level of unidentified assets can allow the service to be reviewed from the perspective of an actual attacker, thereby conducting periodic security checks.

According to an embodiment of the present disclosure, the system for assessing the threat level of unidentified assets can quickly identify leaked or combined certificate information and prepare in advance for additional security incidents.

Figure 5:
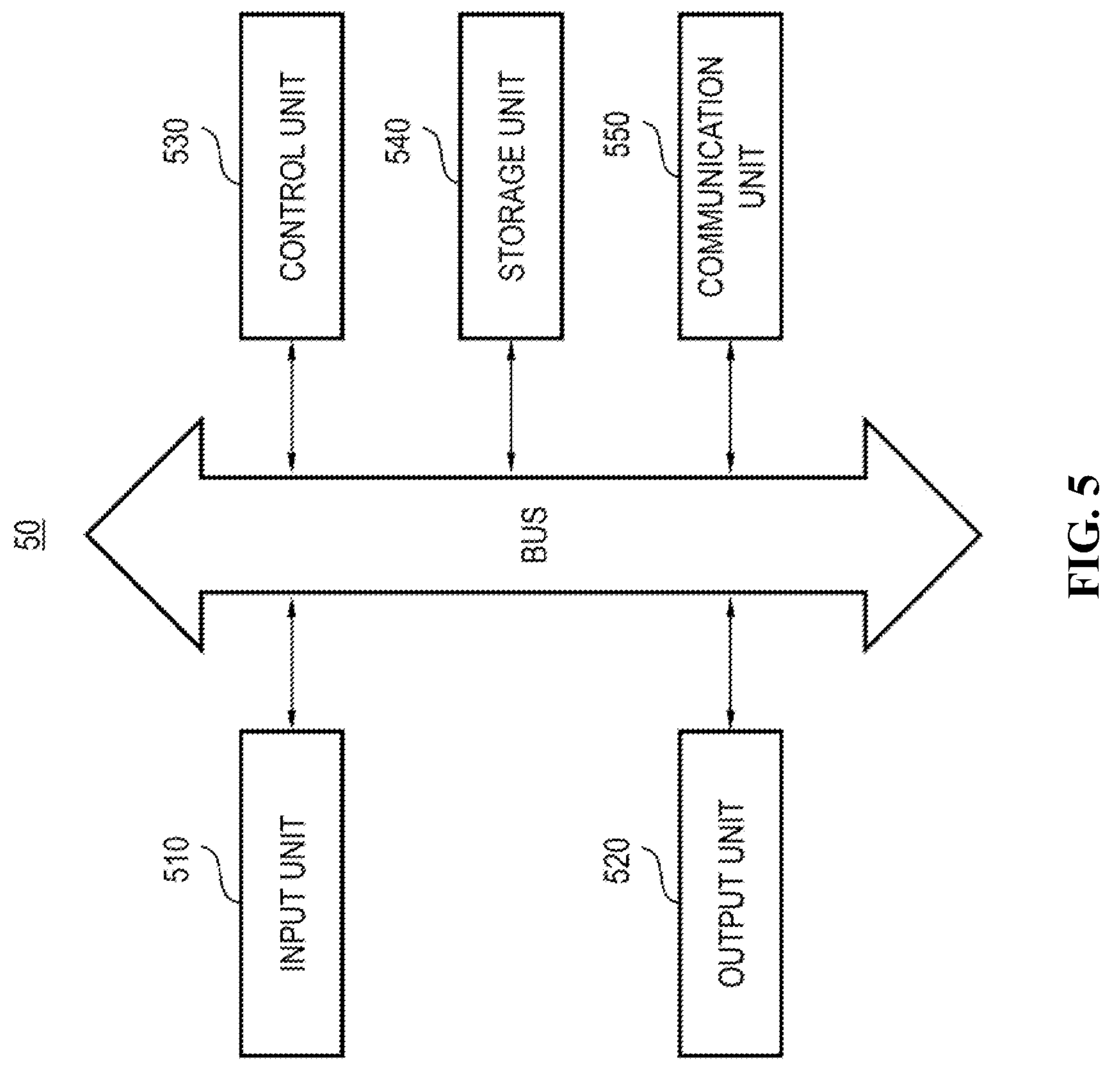
FIG. 5 is a diagram illustrating the configuration of a server according to an embodiment of the present disclosure.

FIG. 5 is a diagram illustrating the configuration of a server according to an embodiment of the present invention.

Referring to FIG. 5, a server 50 includes an input unit 510, an output unit 520, a control unit 530, a storage unit 540, and a communication unit 550.

The input unit 510 receives commands or information from an administrator. The input unit 510 may include one or more of a microphone for receiving an audio signal and a key input unit 510. The key input unit 510 may include a touch key and/or a mechanical key.

The output unit 520 outputs command processing results or various information to the administrator. For example, the output unit 520 outputs information generated by the above-described method, apparatus, or system for assessing the threat level of unidentified assets. To this end, the output unit 520, although not shown in the drawing, may include a display, a speaker, a haptic output unit, and an optical output unit. The display may be provided as a flat panel display, flexible display, opaque display, transparent display, electronic paper (E-paper), or any form well known in the art to which this disclosure pertains. A touch pad may be stacked on the display to form a touch screen, and the touch key may be implemented through this touch screen. In addition to the display and speaker, the output unit 520 may further include any type of output means well known in the art to which this disclosure pertains.

The control unit 530 connects and controls components within the server 50. As an example, each component is controlled so that the information generated from the above-described method, apparatus, or system for assessing the threat level of unidentified assets can be output through the output unit 520. As another example, when confirmation information is input by the administrator, the control unit 530 generates a response signal including the confirmation information. The control unit 530 may include a central processing unit (CPU), micro-processor unit (MPU), micro-controller unit (MCU), graphics processing unit (GPU), or any type of processor well known in the art to which this disclosure pertains.

The storage unit 540 stores data, programs, and applications necessary for the server 50 to operate. The storage unit 540 may include non-volatile memory, volatile memory, hard disk, optical disk, magneto-optical disk, or any type of computer-readable recording medium well known in the art to which this disclosure pertains.

The communication unit 550 communicates with other server(s) through a wired or wireless network. For example, the communication unit 550 may request necessary network information or data from other server(s) and receive the requested network information or data from the other server (s). To this end, the communication unit 550 supports wired communication and/or wireless communication methods.

Referring to FIG. 5, the input unit 510 receives an input signal (e.g., an input signal specifying a server or one or more services to perform threat level analysis, a signal input by a user interface, etc.) from a user or administrator. The output unit 520 may provide the information (e.g., network information, collected data, data sets according to embodiments, threat information of each server or service, etc.) generated or collected by the system for assessing the threat level of unidentified assets according to embodiments to a user or administrator, or output/display the information on a display unit. The control unit 530 may perform some or all of the operations of the system for assessing the threat level of unidentified assets described in FIGS. 1 to 4, or control a processor to perform these operations. The storage unit 540 may include a storage unit or a database system included in the system for assessing the threat level of assets. The communication unit 550 may include one or more transmitters and/or receivers for communicating with a server or one or more services to perform threat level analysis.

As described above, according to an embodiment of the present disclosure, a system for assessing the threat level of unidentified assets can detect potential risks present in a server(s) in various ways, thereby reducing errors generated when a user directly reviews all risks, that is, human errors.

According to an embodiment of the present disclosure, the system for assessing the threat level of unidentified assets can reduce network load on the server(s) and reduce unnecessary delays, while reducing interference occurring in service provision and efficiently detecting the threat level of the server(s).

According to an embodiment of the present disclosure, the system for assessing the threat level of unidentified assets can quickly identify unidentified assets such as assets, data, and network settings that are not recognized internally by the server or service.

According to an embodiment of the present disclosure, the system for assessing the threat level of unidentified assets can allow the service to be reviewed from the perspective of an actual attacker, thereby conducting periodic security checks.

According to an embodiment of the present disclosure, the system for assessing the threat level of unidentified assets can quickly identify leaked or combined certificate information and prepare in advance for additional security incidents.

The effects of the present disclosure are not limited to the effects mentioned above, and other effects that are not mentioned may be clearly understood by those skilled in the art from the description below.

In addition, exemplary embodiments of the present disclosure described in the present specification and shown in the accompanying drawings are only specific examples provided in order to easily describe technical contents of the present disclosure and assist in the understanding of the present disclosure, and are not to limit the scope of the present disclosure. It is obvious to those of ordinary skill in the art to which the present disclosure pertains that other modifications based on the technical idea of the present disclosure can be implemented in addition to the embodiments disclosed herein.

What is claimed is:

1. An apparatus for deriving a threat level of data, the apparatus comprising:

a processor; and a memory storing instructions executable by the processor, wherein the processor is configured to execute the instructions to:

confirm network information of a server, wherein the network information includes host information of the server and information about each of services included in the server, confirm data disclosed on the server, wherein the data disclosed on the server includes account information, generate a plurality of data sets by combining the confirmed data and a plurality of words, wherein the plurality of words include words related to an ID or a password, determine a threat level for each of the services based on the network information of the server and the plurality of data sets, and derive a threat level for the server based on the threat level for each of the ene er mere services, wherein the processor is further configured to execute the instructions to:

confirm the information about each of the services by searching for a plurality of ports for the server using a port scan method based on Internet protocol (IP) information of the server, wherein the processor is further configured to execute the instructions to:

determine the threat level for each of the services based on a type of each of the services, wherein the services included in the server comprise a first service and a second service, and a type of the first service is a hypertext transfer protocol (HTTP)-related service and a type of the second service is a service different from the HTTP-related service, and wherein the processor is further configured to execute the instructions to:

based on the type of the second service, determine a threat level for the second service according to (i) whether the second service is externally disclosed, (ii) whether a communication type for the second service is in plaintext, (iii) whether a version of the second service is the latest, and (iv) whether sensitive information is in banner information included in the network information, and based on the type of the first service, determine a threat level for the first service according to (i) whether the first service is externally disclosed, (ii) whether the communication type for the first service is in plaintext, (iii) whether the version of the first service is the latest, (iv) whether the sensitive information is in the banner information, (v) whether each page provided by the first service is externally disclosed, (vi) whether the sensitive information is included in each page provided by the first service, and (vii) whether the first service is externally disclosed.

2. The apparatus of claim 1, wherein the network information includes certificate information for each of the services included in the server.

3. The apparatus of claim 1, further comprising:

a transmitter configured to request the network information or the data disclosed on the server from the server; and a receiver configured to receive a response based on the request.

4. The apparatus of claim 3, wherein the transmitter requests the network information in a random order.

5. The apparatus of claim 1, wherein the processor is further configured to execute the instructions to confirm the data disclosed on the server at a predetermined period, and generate the plurality of data sets at the predetermined period.

6. The apparatus of claim 1, further comprising:

a first storage configured to store the network information; and a second storage configured to store the plurality of data sets, wherein the processor is further configured to execute the instructions to confirm uniform resource locator (URL) or domain information indicating a source from which the data disclosed on the server is collected, and the second storage stores the data disclosed on the server together with the URL or domain information.

7. The apparatus of claim 6, wherein the processor is further configured to execute the instructions to combine the account information and the words related to the ID or the password among the plurality of words, and store a result of the combination or a hash value of the result together with the account information in the second storage.

8. A method of deriving a threat level of data, the method comprising:

confirming network information of a server, wherein the network information includes host information of the server and information about each of services included in the server;

confirming data disclosed on the server, wherein the data disclosed on the server includes account information, generating a plurality of data sets by combining the confirmed data and a plurality of words, wherein the plurality of words include words related to an ID or a password;

determining a threat level for each of the services based on the network information of the server and the plurality of data sets; and deriving a threat level for the server based on the threat level for each of the services, wherein the confirming of the network information comprises confirming the information about each of the services by searching for a plurality of ports for the server using a port scan method based on Internet protocol (IP) information of the server, wherein the threat level for each of the services is determined based on a type of each of the services, wherein the one or more services included in the server comprise a first service and a second service, and a type of the first service is a hypertext transfer protocol (HTTP)-related service and a type of the second service is a service different from the HTTP-related service, and wherein the determining of the threat level for each of the services comprises:

based on the type of the second service, determining a threat level for the second service according to (i) whether the second service is externally disclosed, (ii) whether a communication type for the second service is in plaintext, (iii) whether a version of the second service is the latest, and (iv) whether sensitive information is in banner information included in the network information, and based on the type of the first service, determining a threat level for the first service according to (i) whether the first service is externally disclosed, (ii) whether the communication type for the first service is in plaintext, (iii) whether the version of the first service is the latest, (iv) whether the sensitive information is in the banner information, (v) whether each page provided by the first service is externally disclosed, (vi) whether the sensitive information is included in each page provided by the first service, and (vii) whether the first service is externally disclosed.

* * * * *